No. 861,838. PATENTED JULY 30, 1907.
J. B. HEBER.
HAY RACK.
APPLICATION FILED JULY 12, 1906.
2 SHEETS—SHEET 2.
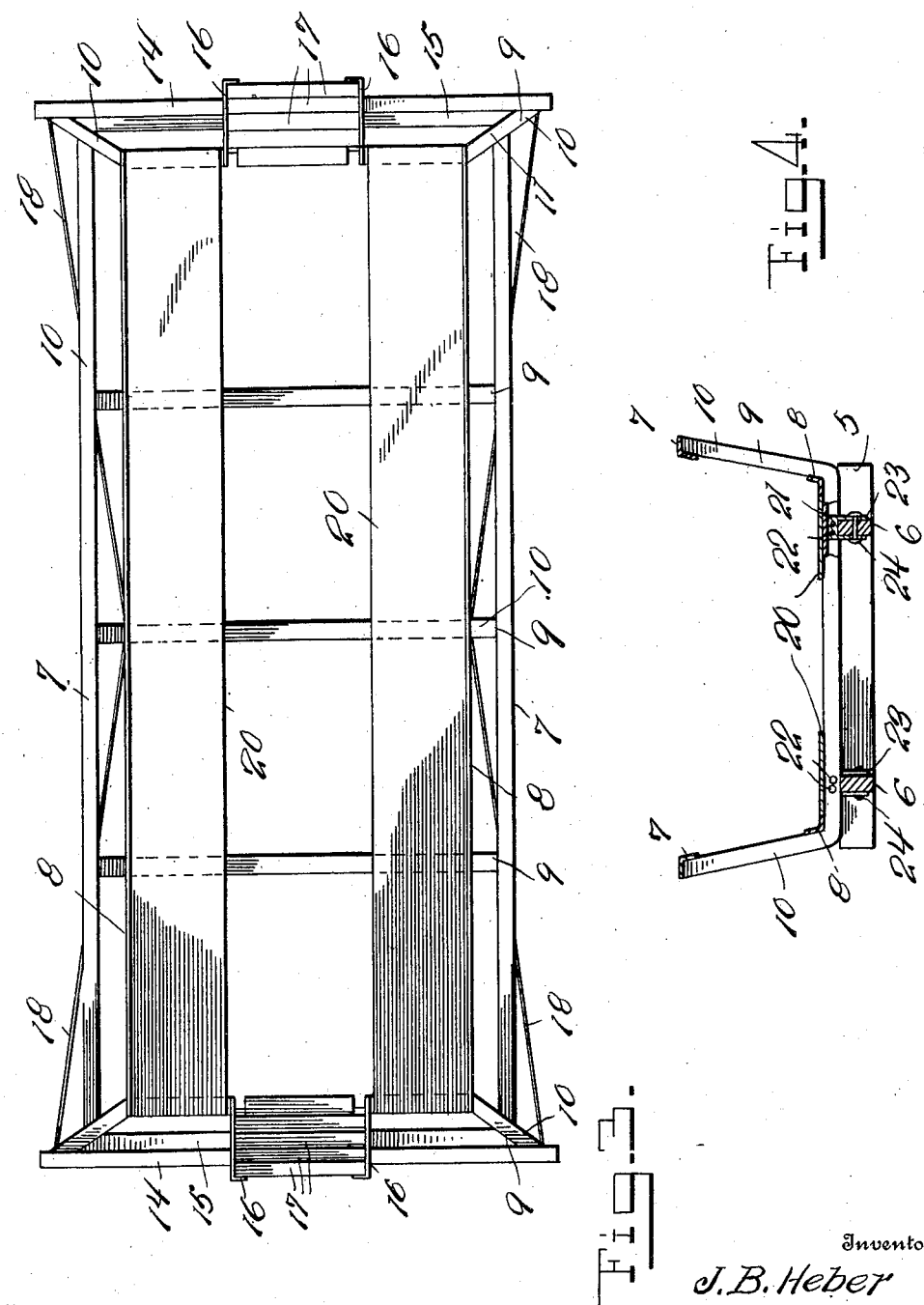
Witnesses
G. R. Thomas
F. G. Smith.
Inventor
J. B. Heber
By
Attorneys

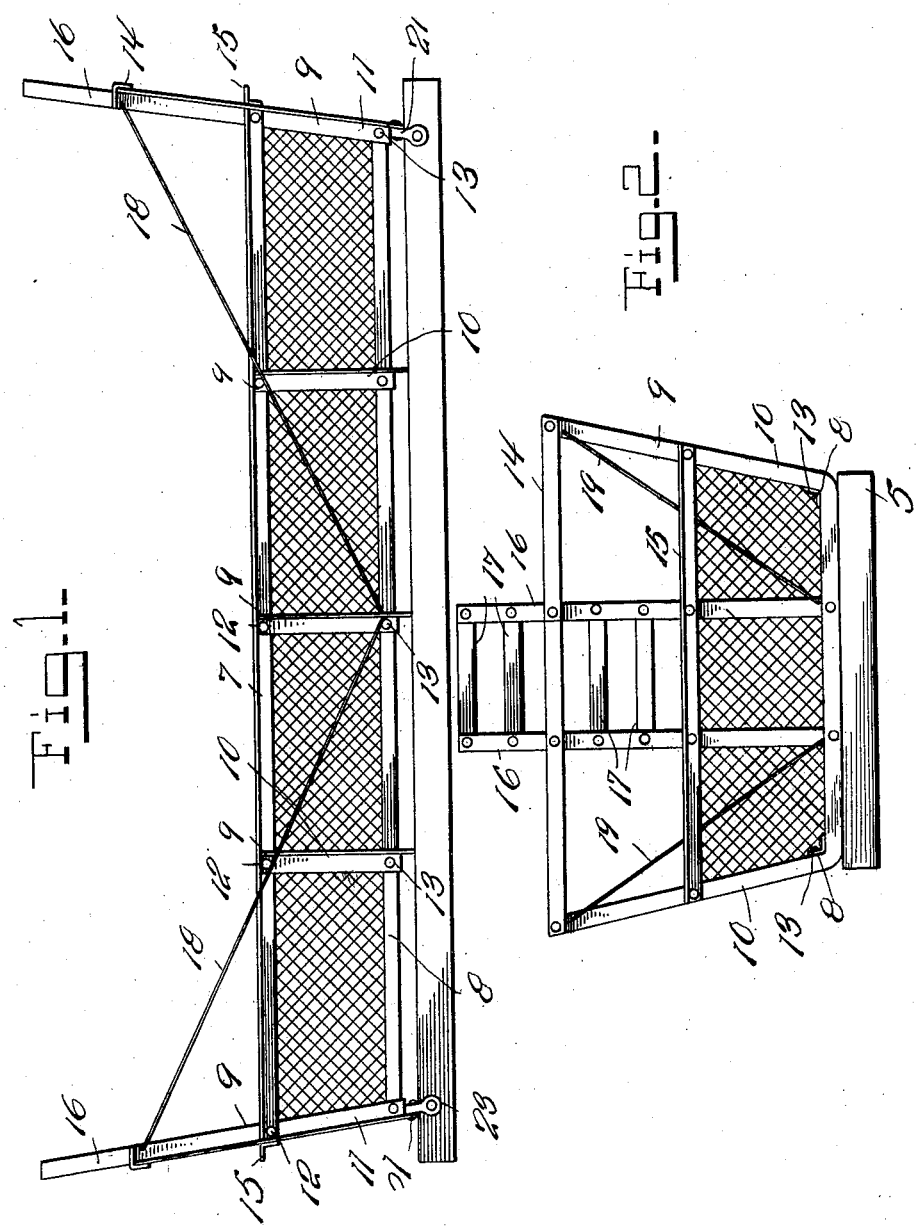

UNITED STATES PATENT OFFICE.

JOHN B. HEBER, OF MAZEPPA, MINNESOTA.

HAY-RACK.

No. 861,838.   Specification of Letters Patent.   Patented July 30, 1907.

Application filed July 12, 1906. Serial No. 325,949.

*To all whom it may concern:*

Be it known that I, JOHN B. HEBER, a citizen of the United States, residing at Mazeppa, in the county of Wabasha, State of Minnesota, have invented certain new and useful Improvements in Hay-Racks; and I do hereby declare the following to be a full, clear, and exact description of the invention, such as will enable others skilled in the art to which it appertains to make and use the same.

This invention relates to hay racks, and more particularly to a construction of hay rack, which may be made of angle-iron throughout, thereby lessening the weight and also the cost of devices of this kind, and enabling the same to be placed upon the market—which is practically impossible with any of the ordinary forms of wooden hay racks now in use.

A further object of the invention is to provide simple but efficient means for securing the rack upon a wagon bed.

In the accompanying drawings:—Figure 1 is a side elevation of the invention. Fig. 2 is an end view thereof. Fig. 3 is a plan view. Fig. 4 is a detail vertical transverse sectional view through the same.

Referring more specifically to the drawings, the numeral 5 denotes the wagon bed, which is of the ordinary construction, and includes the usual longitudinal beams 6, and upon the bed is designed to be supported the hay rack embodying my invention, which will now be described. The said rack comprises a frame formed of angle-iron, and including upper and lower side sills 7 and 8, which are supported by means of angle-iron frames 9, which extend transversely of the rack, and are located at intervals throughout the length of the side sills 7 and 8. Each of the frames 9 includes spaced upwardly extending side members 10, which are formed by bending the angle-iron bar, from which the frame is formed, adjacent its ends, the bend being made in such a manner that one wing 11 of the angle-iron bar will have all its portions presented inwardly of the rack. The upper rails each have one of their wings lying in a substantially horizontal plane, and resting upon the upper ends of the upwardly extending side portions 10 of the frames 9, and their other wing lying against the upper end portion of the wings 11, there being bolts 12 engaged through the said last named wings of the sills 7 and the wings 11 which they lie against. The lower sills 8 are disposed in the angles formed by the upwardly extending side portions of the frames 9 and the connecting portions thereof, and are secured in this position by means of bolts 13. The end ones of the frames 9 have their portions 10 extended above the plane occupied by the upper ends of the corresponding portions of the intermediate frames 9, and connecting the upper ends of the portions 10 of the end frames are cross-beams 14, which are also of angle-iron formation. Similar beams 15 connect the said portions of the end frames 9 intermediate their upper ends and the connecting portions of the frames, and lie preferably in a common plane with the upper sills 7 of the rack. The end frames also include vertical bars 16 and cross-bars 17, which latter are connected at their ends to the bars 16 and serve to hold the same in spaced relation.

In order to brace the members forming the rack, I provide brace-rods 18, which are connected at their ends to the upper ends of the upwardly extending portions of the end frames 9, and at their middle to the lower end of the upwardly extended portions of the middle one of the frames 9, and also provide other brace-rods 19, which are each connected at their upper ends to the upper ends of the upwardly extended portions of the end frames 9, and at their lower ends to the lower ends of the adjacent vertical bars 16. A sheet-metal flooring 20 is provided in the bottom of the rack, and a wire netting is stretched over the sides and ends of the rack.

In order that the rack may be securely held upon the wagon bed, I provide upon the vertical wing of the connecting portion of each frame 9, a suitable clamp which is designed for engagement with the longitudinal beams of the wagon bed. Each clamp comprises a block 21, which is bolted or otherwise secured, as at 22, to the said wing, and which has spring arms 23 extending therefrom. A bolt 24 is engaged through the said arms 23, and, when turned, serves to cause the arms to clamp the beams of the bed, it being understood that the rack is placed upon the bed with the beams located between the arms.

What is claimed, is:—

A hayrack comprising spaced parallel transverse angle iron beams having upwardly extending side arms and a transverse portion connecting said side arms, the outermost of said beams having their side arms extended vertically and of greater height than the side arms of the intervening beams, cross bars spanning said outermost beams, at points coincident with the upper ends of said intervening beams, parallel longitudinal lower sills secured to said transverse beams at the junctions of said connecting portions with said side arms, parallel longitudinal upper sills secured to the upper ends of the intervening beams and having their ends secured to said outermost beams and braces having their ends fixed to said outermost beams along the upper portion thereof, and extending downwardly therefrom and having their lower ends secured to a central beam.

In testimony whereof, I affix my signature, in presence of two witnesses.

JOHN B. HEBER.

Witnesses:
NICK HEBER,
B. D. MITCHELL.